W. C. HOLLOWELL.
DEVICE FOR RENDERING LARD.
APPLICATION FILED FEB. 1, 1922.
1,432,754.   Patented Oct. 24, 1922.
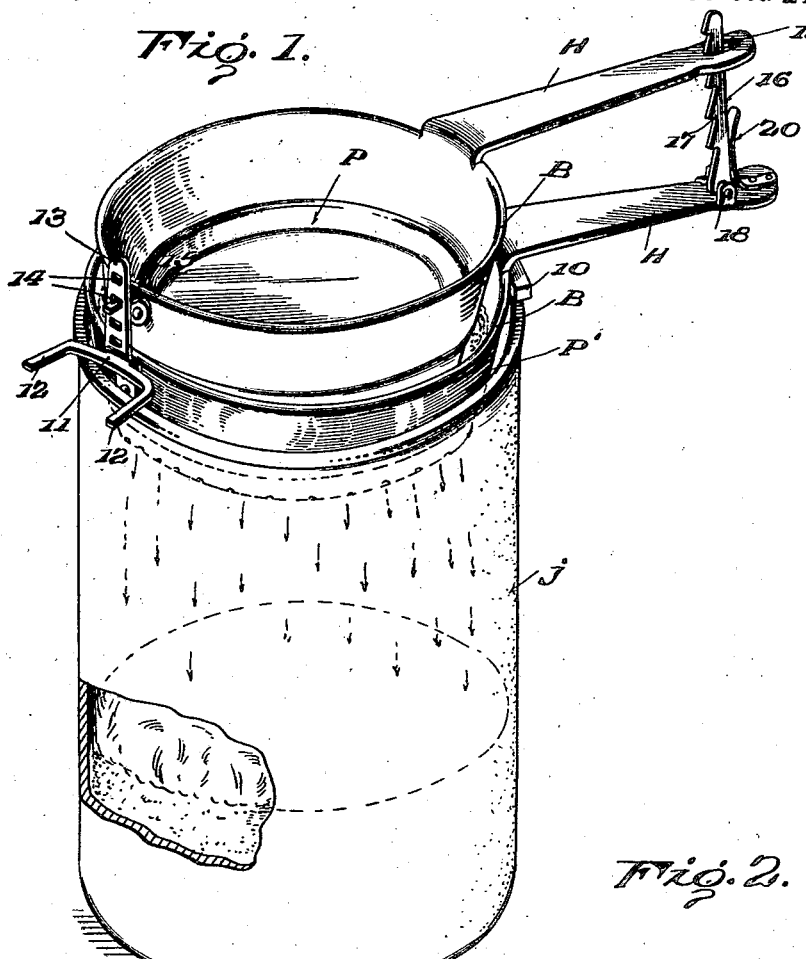
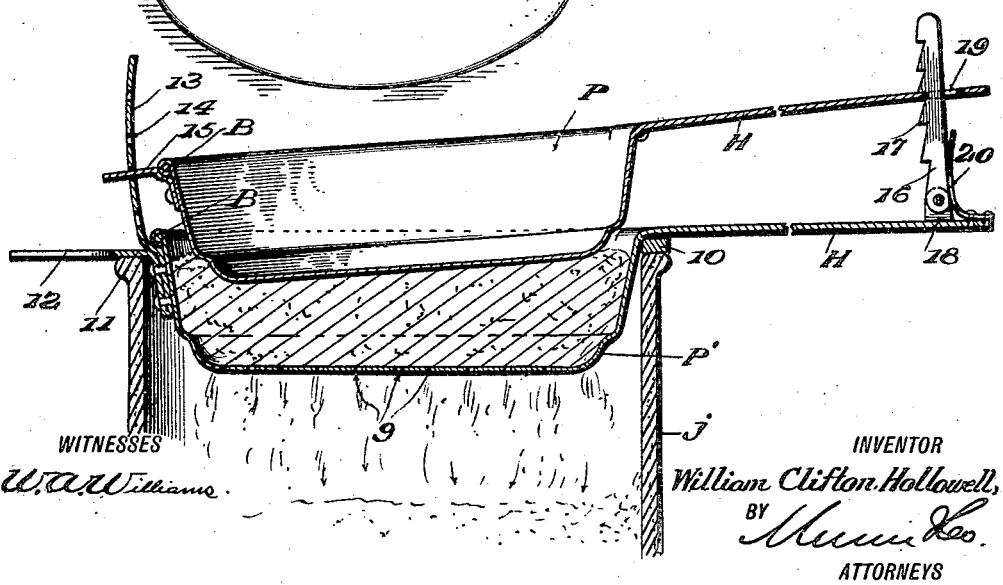
WITNESSES
W. A. Williams
INVENTOR
William Clifton Hollowell,
BY
ATTORNEYS Patented Oct. 24, 1922.

1,432,754

UNITED STATES PATENT OFFICE.

WILLIAM CLIFTON HOLLOWELL, OF GOLDSBORO, NORTH CAROLINA.

DEVICE FOR RENDERING LARD.

Application filed February 1, 1922. Serial No. 533,402.

*To all whom it may concern:*

Be it known that I, WILLIAM CLIFTON HOLLOWELL, a citizen of the United States, and a resident of Goldsboro, in the county of Wayne and State of North Carolina, have invented certain new and useful Improvements in Devices for Rendering Lard, of which the following is a specification.

This invention relates to a device for rendering lard.

The object of the invention is to provide a device of the above character which is adapted to be placed over a receptacle into which it is intended to store the lard being rendered and easy to manipulate for rendering lard in a highly efficient and expeditious manner.

It is also within the scope of the objects of the invention that the rendering device be exceedingly simple in construction and inexpensive to manufacture.

Other objects will hereinafter appear.

In carrying out the invention it is contemplated to utilize two pans of substantially the same depth and size, one pan being adapted to set within the other. Means are provided whereby pressure may be exerted between the bottom of the top pan and the contents which may be within the bottom pan. The pans are also freely detachable from one another and this enables each pan to serve as a kitchen utensil when not being used for lard rendering purposes.

The invention is illustrated by way of example in the accompanying drawing, in which, Figure 1 is a perspective view illustrating the application of the invention, and Figure 2 is a partial vertical sectional view of the same.

Referring to the drawings more particularly P and P' indicate two pans, the pan P being adapted to set within the pan P' and both pans being preferably of the depth shown. The bottom of the pan P is solid while the bottom of the pan P' is perforated as shown in Figure 2 at 9. The pans may be of any desired size depending upon the rapidity with which it is intended to render the lard.

Each pan is formed or provided with a handle H, said handles being of substantially the same length and extending at substantially right angles to the sides of each pan. When one pan is seated within the other the handles are adapted to be in superposed relation. Each pan may be formed with a bead B extending about its upper edge and the pan P' may have a block of any suitable material positioned beneath the inner end of its handle H as at 10 in order to form a seat upon a jar J or other receptacle into which it is intended to store the lard. Diametrically opposite to the handle H there is secured to the side wall of the pan P' an L-shaped member 11, the free portion of which is bifurcated to provide the prongs 12 to rest upon the upper edge of the jar J and aid in supporting the pans as shown in the drawings. The handle H and member 11 in other words serve as a bridging means for supporting the device over a jar or other receptacle in which it is intended to store the lard.

Also secured to the lower pan P' is a finger 13 which extends upwardly as shown and which should be located at a point diametrically opposite to the handle H of the pan to which it is secured. The member 13 is preferably of the width shown and provided with a plurality of transverse slots 14 which are in superposed relation. At the same relative point on the pan P' there is secured to its side wall a finger 15 which extends at right angles to the side wall of the pan and the outer end of which is adapted to slide within either of the slots 14 in the member 13. The finger 15 is further adapted to serve as a fulcrum or pivot upon which the pan P may be swung upwardly and downwardly with relation to the pan P'.

Adjacent the outer end of the handle of the pan P' there is pivotally connected the one end of a latch member 16 which is in the form of a strap shown and having its inner edge formed with teeth 17. The latch member 16 may be pivoted to ears 18 formed with the handle H by the means of a pin as shown. The upper end of the latch extends through an elongated slot 19 formed in the outer end of the handle for the pan P. Also there is secured upon the outer end of the handle for the pan P' a spring finger 20 which is adapted to press against the latch member 16 for forcing the same inwardly and thus cause its teeth 17 to engage with the handle of the pin P and hold the same from upward movement with relation to the handle of the pan P'. It may be mentioned that the finger 15 in conjunction with the member 14 limits the forward movement of the pan P, the advantages of which will later be made apparent in the description of the operation of the present rendering device.

In using the lard rendering device heretofore described a napkin preferably of cheese cloth should be placed within the lower pan P' so that it can cover the entire inner surface of the pan. The pan P' may now be set upon a receptacle into which it is intended to store the lard. The commingled liquid lard or fat and crackling may now be poured into the pan P' until the pan P' is substantially filled with crackling. The cheese cloth napkin may now be brought about the crackling and then the pan P may be brought into use. The finger 15 of the pan P should first be inserted in one of the uppermost slots 14 of the member 15 and the handle H of the pan brought downward toward the handles of the pan P'. Pressure may be exerted to press the crackling within the pan P' until the handles H are substantially brought together or until such time when no further effective pressure can be exerted between the pans. The pan P may now be re-arranged, its finger 15 inserted in a lower slot 14 and in this way a greater effective pressure obtained. After the lower slot 14 has been attained then the handles may be brought together as close as possible and the latch 16 permitted to engage the handle of the pan P to hold the same in its depressed position. The pans may now set for a period in order to permit the lard to be thoroughly drawn from the crackling and after this is completed the pans may be removed or detached from one another and the process repeated.

When the device is not being used for rendering lard the pan P may serve as a cooking utensil and the attachments thereof will in no way make the pan awkward or clumsy. Also the pan P' might be used for a strainer or as a receptacle, if so desired.

What I claim is:

1. A device of the character described comprising a pair of pans one of which is adapted to set within the other, a handle extending from each pan and adapted to be disposed one over the other, a finger extending upwardly from the lowermost pan having transverse slots provided therein in superposed relation, a finger extending from the uppermost pan and adapted to enter either of said slots, said fingers in each instance being disposed diametrically to the handles of said pans and adapted to cooperate to serve as a fulcrum or pivot between the pans, a latch element pivoted to the other end of the handle of the lower pan and consisting in a strip having teeth formed upon its innner edge, said latch element extending upwardly through a slot in the associated end of the handle of the upper pan, and a spring finger secured to the outer end of the handle of the lower pan and adapted to press the latch forwardly so that its teeth may engage the handle of the upper pan to hold said handles against outward movement with respect to each other.

2. A device of the character described comprising a pair of pans one of which is adapted to set within the other, a handle extending from each pan and adapted to be disposed one over the other, a finger extending upwardly from the lowermost pan having transverse slots provided therein in superposed relation, a finger extending from the uppermost pan and adapted to enter either of said slots, said fingers in each instance being disposed diametrically to the handles of said pans and adapted to cooperate to serve as a fulcrum or pivot between the pans, and means extending between the free ends of said handles of the pans whereby the handle of the upper pan may be held against upward movement.

3. In a device of the character described comprising a pair of pans one being adapted to set within the other, a handle extending from each pan and in superposed relation to each other, a bifurcated supporting arm extending outwardly from the side wall of the lower pan at a point diametrically opposite to its handle whereby said pan may be supported upon the upper edge of a receptacle or jar, a finger extending upwardly from the lower pan having transverse slots in superposed relation, a finger extending outwardly from the side wall of the upper pan and adapted to extend in either of the slots of the finger extending from the lower pan, said fingers in each instance being diametrically opposite to the handles of said pans and adapted to serve as a pivot for relative movement of said pans, a latch element pivotally connected to the outer end of the handle of the lower pan and adapted to swing inwardly, a spring finger secured to the handle of the lower pan and adapted to press the latch element inwardly, and means whereby the latch element may engage the handle of the upper pan to hold the same from upward movement.

WILLIAM CLIFTON HOLLOWELL.